(12) United States Patent
Chong et al.

(10) Patent No.: US 10,078,311 B1
(45) Date of Patent: Sep. 18, 2018

(54) DIGITAL INPUT DEVICE FOR SMART DEVICE

(71) Applicant: INTERNATIONAL BUSINESS MACHINES CORPORATION, Armonk, NY (US)

(72) Inventors: Liu Chong, Xian (CN); Weijun Li, Xian (CN); Xiao T. Xiao, Beijing (CN); Jinfan Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/603,685

(22) Filed: May 24, 2017

(51) Int. Cl.
*G04G 21/00* (2010.01)
*G04G 21/08* (2010.01)
*G06F 3/044* (2006.01)

(52) U.S. Cl.
CPC ............. *G04G 21/08* (2013.01); *G04G 21/00* (2013.01); *G06F 3/044* (2013.01); *G06F 2203/04105* (2013.01); *G06F 2203/04108* (2013.01)

(58) Field of Classification Search
CPC .................... G04G 21/00; G04G 21/08; G06F 2203/04105; G06F 2203/04108
See application file for complete search history.

(56) References Cited

U.S. PATENT DOCUMENTS

| | | | | |
|---|---|---|---|---|
| 1,611,835 A * | 12/1926 | Keaney | ................ | B43K 29/001 33/27.02 |
| 3,647,059 A * | 3/1972 | Humphreys | ........... | G02C 11/00 15/214 |
| RE30,346 E * | 7/1980 | Klaber | ................... | B43K 23/00 401/131 |
| 4,317,638 A * | 3/1982 | Klaber | ................. | A44B 15/005 401/195 |
| 5,061,104 A * | 10/1991 | Florjancic | ............ | B43K 23/122 401/195 |
| 5,988,918 A * | 11/1999 | Johnson | ................. | B43K 5/005 401/88 |
| 6,577,299 B1 | 6/2003 | Schiller et al. | | |
| 6,977,868 B2 | 12/2005 | Brewer et al. | | |
| 8,493,369 B2 * | 7/2013 | Liang | ..................... | B43K 23/06 178/19.01 |
| 9,250,708 B2 * | 2/2016 | Natarajan | ............. | G06F 3/0221 |

(Continued)

FOREIGN PATENT DOCUMENTS

CN          105242797          1/2016

*Primary Examiner* — Sean Kayes
(74) *Attorney, Agent, or Firm* — Schmeiser, Olsen & Watts; Michael A. Petrocelli

(57) ABSTRACT

A digital device and a method of forming a digital device. The digital device includes a body, circuitry and a folding assembly. The body is provided with a body having a pointer end and a tail end opposite the pointer end. Circuitry is disposed within the body for sending or receiving signals representing a position of the pointer end relative to a signal receiving surface disposed on a watch. A folding assembly integral with the body permits the body to fold from a linear shape to a folded shape adapted to circumscribe at least a portion of a watch band. The body may be formed with a plurality of hinges interconnecting a plurality of segments of the body, wherein the plurality of hinges connects the body segments to permit the body to pivot from the linear shape to a geometric shape adapted to circumscribe a portion of the watch band.

19 Claims, 6 Drawing Sheets

(56) References Cited

U.S. PATENT DOCUMENTS

| | | | |
|---|---|---|---|
| 9,383,836 B2* | 7/2016 | Natarajan | G06F 3/0221 |
| 9,575,577 B2* | 2/2017 | Natarajan | G06F 3/0221 |
| 2003/0151982 A1* | 8/2003 | Brewer | G04G 21/00 |
| | | | 368/46 |
| 2014/0160025 A1* | 6/2014 | Natarajan | G06F 3/0221 |
| | | | 345/168 |

* cited by examiner

DIGITAL INPUT DEVICE FOR SMART DEVICE

TECHNICAL FIELD

This invention relates to an apparatus for inputting information into a smart device. More specifically, the invention is an input pen for a smart device and a method of making the same.

BACKGROUND

In recent years, there has been an increasing use of compact, pocket-size electronic personal organizers or personal digital assistants ("PDA") that store personal scheduling information such as appointments, tasks, phone numbers, flight schedules, alarms, birthdays, and anniversaries. PDA's come in all different shapes and sizes as well as being incorporated into wireless telephones, wireless pagers and wrist watches. Some of the more common PDA's, like the Samsung Galaxy or iPad, are equipped with a touch screen for navigation and input of information. Some models even have an attachable input keyboard with both numeric keys and alphabetic keys, as well as special function keys. PDA's may also incorporate a liquid crystal display (LCD) which displays data, text and graphics.

PDA's prove most useful to busy individuals who are frequently traveling or always on the move from one meeting to the next appointment. Unfortunately, due to their hectic schedules, these individuals are the people most likely to forget their PDA's during the frantic rush to gather documents, files, laptops, cellular phones, and travel tickets before departing home or office for their destinations. As such, a desire exists to reduce the number of electronic digital devices that individuals need to remember for business or personal purposes.

With the development of digital watches over the last twenty years, watches have been used to perform a variety of different functions, including games, calculator, various timers, alarms, and sport-related time-keeping functions. Support of these additional functions has required more complicated user interface solutions, which have tended towards an increasing number of push buttons. Watches are now capable of serving as personal information managers, wireless phones, and contain other advanced functionalities, which has required an entirely new user interface solution to simplify user operation. Likewise, digital watches have evolved to the point that the digital watches can function as PDA's. Like the pocket-size devices described above, such watches can be programmed with certain key appointments, tasks, phone numbers, flight schedules, alarms, birthdays, and anniversaries. Watches are part of everyday fashion attire, are more ruggedized, and more convenient to carry and less likely to be forgotten by busy people.

However, data is more difficult to enter into a watch than to enter the same data into a PDA. This difficulty is due in large part to the limited space for input buttons and display characters available on digital wristwatches. Most watches are limited to having only three or four input buttons. A user programs a watch by depressing one or more buttons several times to cycle through various menu options. Once an option is selected, the user depresses another button or buttons to input the desired information. These input techniques are inconvenient and difficult to remember. Such techniques are particularly inconvenient when a wearer wishes to enter an entire month's schedule. Although watches have been made with larger numbers of input keys, such watches are usually much too large for comfort, and tend to be particularly unattractive.

Apart from personal organizers, many people maintain appointment calendars and task lists on PDA's, personal computers (PCs) or cell phones. One example of time management software on the PC is Microsoft's OUTLOOK and on PDA's and cell phones the Palm OS operating system which maintain daily appointment schedules, to-do lists, personal notes, and calendar planning for personal computers. This information is often a duplicate of that maintained on the portable personal organizer, such as the various models produced by Microsoft, Palm and HandSpring.

Today, watches utilize technology for transferring information from a personal computer to a watch.

One of the drawbacks in remotely programming small-size PDA's and watches is that there is no convenient way to easily transfer data between a laptop or PDA and a wristwatch. Instead, entire data sets must be carefully entered by the user during each programming session. If a data entry error is made or the user wishes to make a change, the user must fix the error or make the change at the wrist watch utilizing miniature control inputs. Another drawback is the relatively large power consumption requirements of small PDA's and watches with touch screen data manipulation. Prior art devices require a microcontroller and processor to function a majority of the time in order to keep the PDA or watch properly functioning. Naturally, this results in a shortened battery life span for these devices.

SUMMARY

A digital device and a method of forming a digital device is disclosed. The digital device includes a body, circuitry and a folding assembly. The body is provided with a body having a pointer end and a tail end opposite the pointer end. Circuitry is disposed within the body for sending or receiving signals representing a position of the pointer end relative to a signal receiving surface disposed on a watch. A folding assembly integral with the body permits the body to fold from a linear shape to a folded shape adapted to circumscribe at least a portion of a watch band.

The body may be formed with a plurality of hinges interconnecting a plurality of segments of the body, wherein the plurality of hinges connects the body segments to permit the body to pivot from the linear shape to a geometric shape adapted to circumscribe a portion of the watch band.

BRIEF DESCRIPTION OF THE DRAWINGS

The novel features and characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
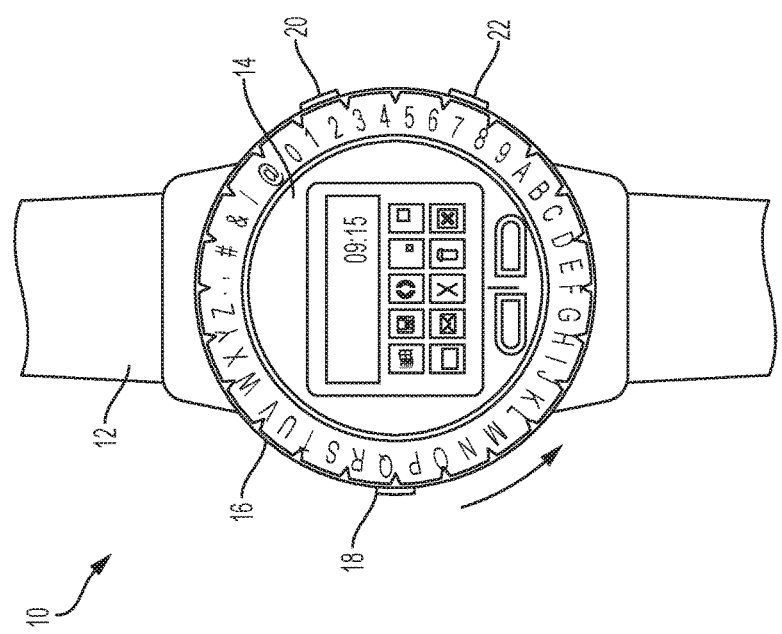
FIG. 1 is a representative example of the prior art disclosing a wristwatch with push button data entry assembly.

FIG. 1 is a representative example of the prior art disclosing a wristwatch with push button data entry assembly. Turning to FIG. 1, prior art device 10 is shown which incorporates data management functions into a computing device sized for the wrist. FIG. 1 is exemplary of prior art solutions for entering data onto wrist watch sized devices, involving a movable circumferential ring or thumbwheel 16 around the watch face 14 that can be rotated to the desired alphanumeric character. Buttons 18, 20, 22 are then pressed by the user in a certain sequence to enter the desired alphanumeric character and perform other watch operations. However, the problem with the current implementation of the thumbwheel 16 interface on watches is that in all implementations buttons 18, 20, 22 are still required to manipulate and enter alphanumeric data. Although the convenience of this type of button control mechanism for the selection and de-selection of data is relevant in a wrist watch application, buttons 18, 20, 22 must be of sufficient size to allow a user to manipulate them which results in a larger watch size and inefficient use of the watch volume.

Figure 2:
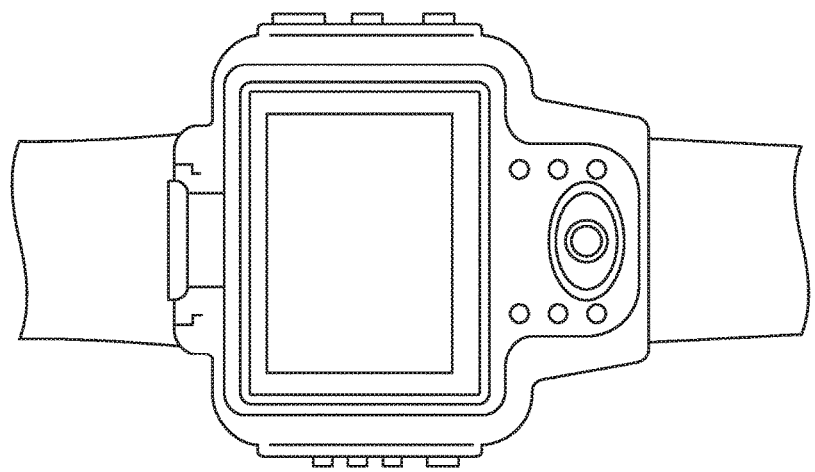
FIG. 2 is a depiction of a prior art watch requiring data entry by manipulation of push buttons for the entry of data.

FIG. 2 is a depiction of a prior art watch requiring data entry by manipulation of push buttons for the entry of data. Once again, the user is required to input and manipulate data on the wrist watch by using small pushbuttons to implement instructions.

Figure 3:
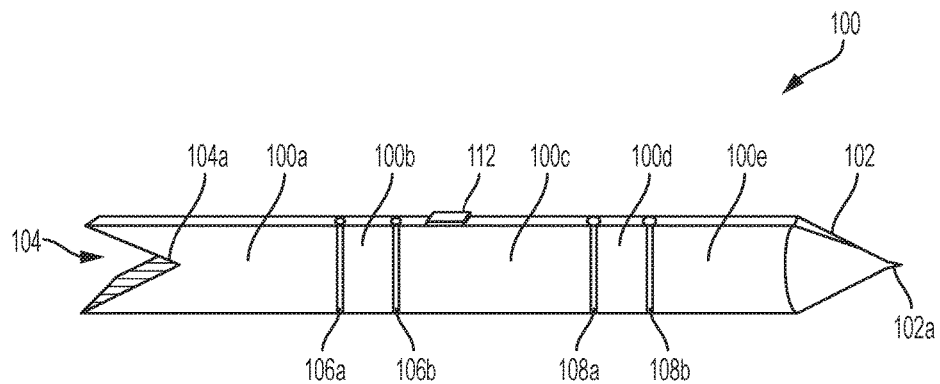
FIG. 3 illustrates a perspective side view of the digital device of an embodiment of the present invention.
Figure 7:
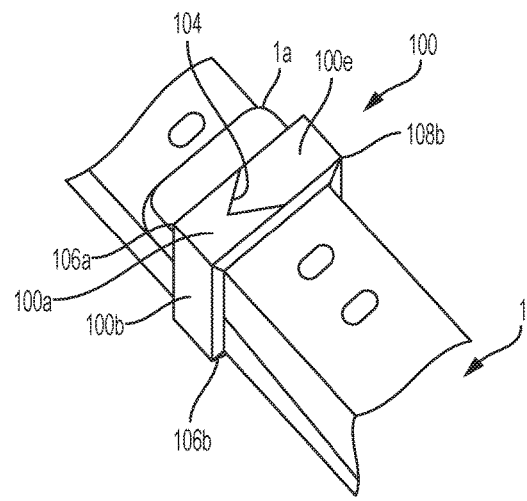
FIG. 7 illustrates an embodiment of the digital device folded around a watch band in accordance with a method of the present invention.

FIG. 3 illustrates a perspective side view of the digital device of an embodiment of the present invention. The digital device 100 of FIG. 3 includes an elongate body with a v-shaped pointer end 102 and a v-shaped cutout tail section 104, which are complimentary shapes to permit the nesting of one with the other. In one embodiment, the digital device 100 may be an input pen or stylus which further includes a plurality of hinges 106a, 106b and 108a, 108b that permit the digital device 100 to fold as will be described in greater detail below. The hinges 106a, 106b, 108a, 108b may be formed of a pin-and-leg structure that permits each segment 100a, 100b, 100c, 100d, 100e to pivot with respect to each other as shown in FIG. 7. The hinges 106 and 108 may take many forms, such as a living hinge, that permit relative pivotal movement of the each respective segment 100a-100e. A living hinge is a thin flexible hinge (flexure bearing) made from the same material as the two rigid pieces the living hinge connects, rather than cloth, leather, or some other flexible substance. The living hinge is typically thinned or cut to allow the rigid pieces to bend along the line of the hinge. The minimal friction and very little wear in such a hinge makes the hinge useful in the design of microelectromechanical systems, and the low cost and ease of manufacturing makes them quite common in some industries. The living hinge may be made of semi-rigid or rigid plastic or flexible metal.

It is noted that the term "fold" or "bend" are intended to encompass arrangements where the article of the invention may be transformed by mechanical movement from a linear shape to a non-linear shape by a folding assembly which may take the form of hinges, a living hinge a bendable material or other assemblies integrally formed with the body that permit the body to be transformed from a linear shape to a non-linear shape or geometric shape such that the body of the digital device 100 may circumscribe at least a portion of a watch band as described below.

The v-shaped pointer end 102 is configured to act as a stylus in the manner known to those of skill in the art. At the terminal end of the pointer end 102 is a nib 102a which, in a conventional ink pen, distributes the ink on a writing surface. In this invention, the nib 102a serves as the contact point for the input device when acting as a stylus in the art of digital devices. Notably, the v-shaped pointer end 102 is sized and configured to nest or lock inside the v-shaped cutout tail section 104 as will be described in more detail below with reference to FIGS. 4 and 6. Additionally, the tail section 104 preferably includes a protective section or nesting section 104a for receiving and protecting the nib 102a when the pointer end 102 is nested within the tail end 104.

Figure 4:
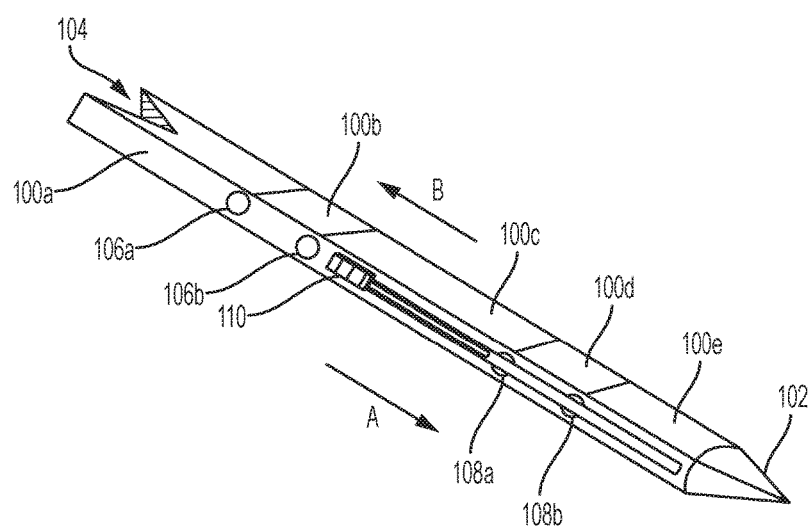
FIG. 4 illustrates a bottom, side, perspective view of the digital device of FIG. 3 according to an embodiment of the present invention.

FIG. 4 illustrates a bottom, side, perspective view of the digital device of FIG. 3 according to an embodiment of the present invention. The embodiment of FIG. 4 includes a pair of slider lock assemblies to provide a shape-retention system that permit the locking of segments 100a-100e in position relative to one another. More specifically, FIG. 4 illustrates a first slider lock assembly 110 that maybe operated by a user and includes a slider button 112 and arm 114 (see FIG. 5). As a user manually slides the button or slider 112 of the slider lock assembly 110 in the direction of arrow 'A' in FIG. 4, the arm 114 projects out of the middle segment 100c, through the intermediate segment 100d and partially into the tip-end segment 100e. The arm 114 is relatively rigid and, thus, retains the segments 100c, 100d, and 100e in a straight-line position relative to one another as illustrated in FIG. 4. When the button 112 is returned to the button's original position shown in FIG. 4, the arm 114 is withdrawn from the segments 100d and 100e thereby permitting each segment 100c, 100d and 100e to pivot relative to one another.

Figure 5:
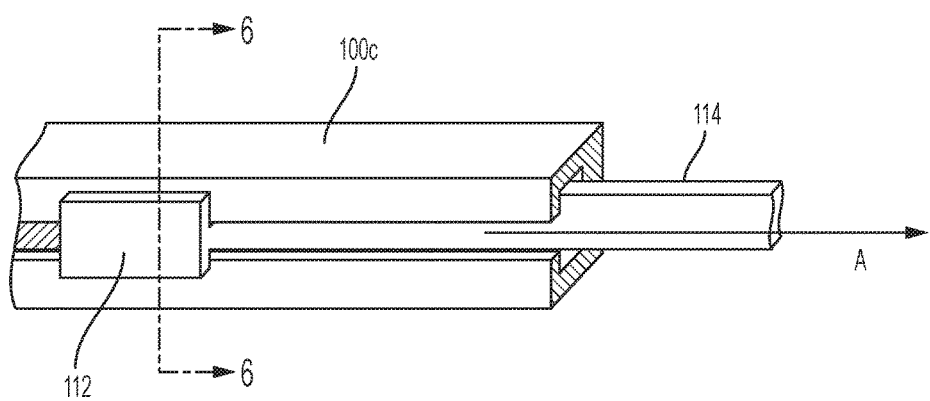
FIG. 5 illustrates a partial perspective view of the central section of the digital input device according to an embodiment of the present invention.

FIG. 5 illustrates a partial perspective view of the central section 100c of the digital device according to an embodiment of the present invention. The slider lock assembly 112 is illustrated with the arm 114 projecting from the central section 110c of the body of the digital device 100 and the button or slider 112 in the locked position.

Figure 6:
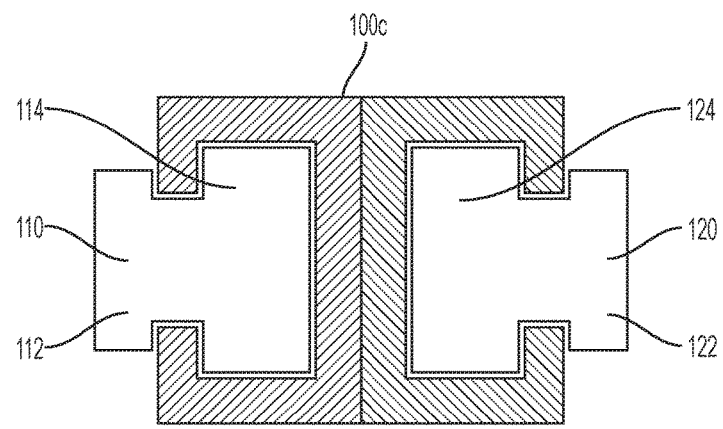
FIG. 6 illustrates a cross-sectional view of a portion of segment of the digital device taken along section line VI-VI in FIG. 5 and according to an embodiment of the present invention.

FIG. 6 illustrates a cross-sectional view of a portion of segment of the digital device taken along section line VI-VI in FIG. 5 and according to an embodiment of the present invention. As shown in FIG. 6 and conveyed in FIG. 5, a second slider lock assembly (see 120 in FIG. 6) is disposed on the opposite side of the segment 100c from the first slider lock assembly 110 and the second slider lock assembly 120 is a mirror of the structure of the first slider lock assembly 110. Likewise, the second slider lock assembly 120 may be operated by a user and includes a slider button 122 and a slider arm 124 (see FIG. 6) to lock the other segments 100a and 100b relative to segment 100c. As a user slides the button 122 of the second slider lock assembly 120 in the direction of arrow 'B' in FIG. 4, the arm 124 projects out of the middle segment 100c, through the intermediate segment 100b and partially into the rear-end segment 100a. The arm 124 is relatively rigid and, thus, retains the segments 100a, 100b, and 100c in a straight-line position relative to one another as illustrated in FIG. 4. When the button 122 is returned to the button's original position shown in FIG. 4, the arm 124 is withdrawn from the segments 100a and 100b thereby permitting each segment 100a, 100b and 100c to pivot relative to one another.

FIG. 7 illustrates an embodiment of the present invention folded around a watch band in accordance with a method of the present invention. The watch band 1 may take many shapes, forms, sizes, materials, etc. as will be understood by those of skill in the art and may include a clasp assembly (see clasp 2 in FIG. 8) typical in the art of watch bands. The digital device 100 of the present invention may be shaped as a typical band retention member conventionally disposed adjacent as clasp assembly to assist in the securement of the end of the watch band which may be made of leather. The body of the digital device 100 is formed of segments 100a-100e formed of aluminum, steel, rigid plastic, titanium, and any other suitable material that provides rigidity but suitable flexibility to serve as a stylus. FIG. 7 illustrates the watch band 1 being overlapped with itself and having an end 1a held in place by the body of the digital device 100 in a manner that is known in the art.

Figure 8:
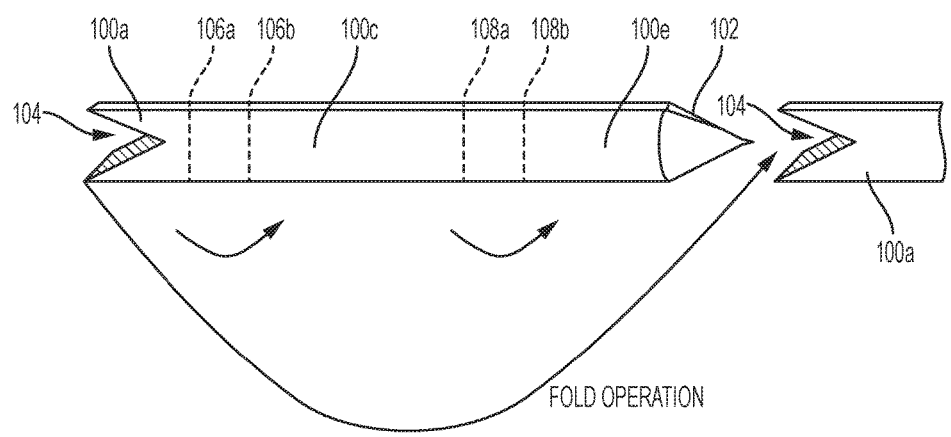
FIG. 8 is a schematic side view of the digital device with a portion of the tail end represented relative to the pointer end in accordance with an embodiment of the present invention.

FIG. 8 is a schematic side view of the digital device 100 of the present invention with a portion of the tail end represented relative to the pointer end in accordance with an embodiment of the present invention. FIG. 8 illustrates four fold areas which are provided by the hinges 106a, 106b, 108a, 108b. Of course, the number of physical hinges may varying depending on the size of the digital device and the desired shape when the digital device 100 is folded during use. Likewise, the dimension shown on FIG. 8 are by way of example only and may varying depending on the environment the digital device 100 is being used. As described herein, the digital device 100 is designed to be folded around a watch band during use and, in the folded shape or position, the pointer end 102 mate with a corresponding or complimentary tail end 104.

Figure 9:
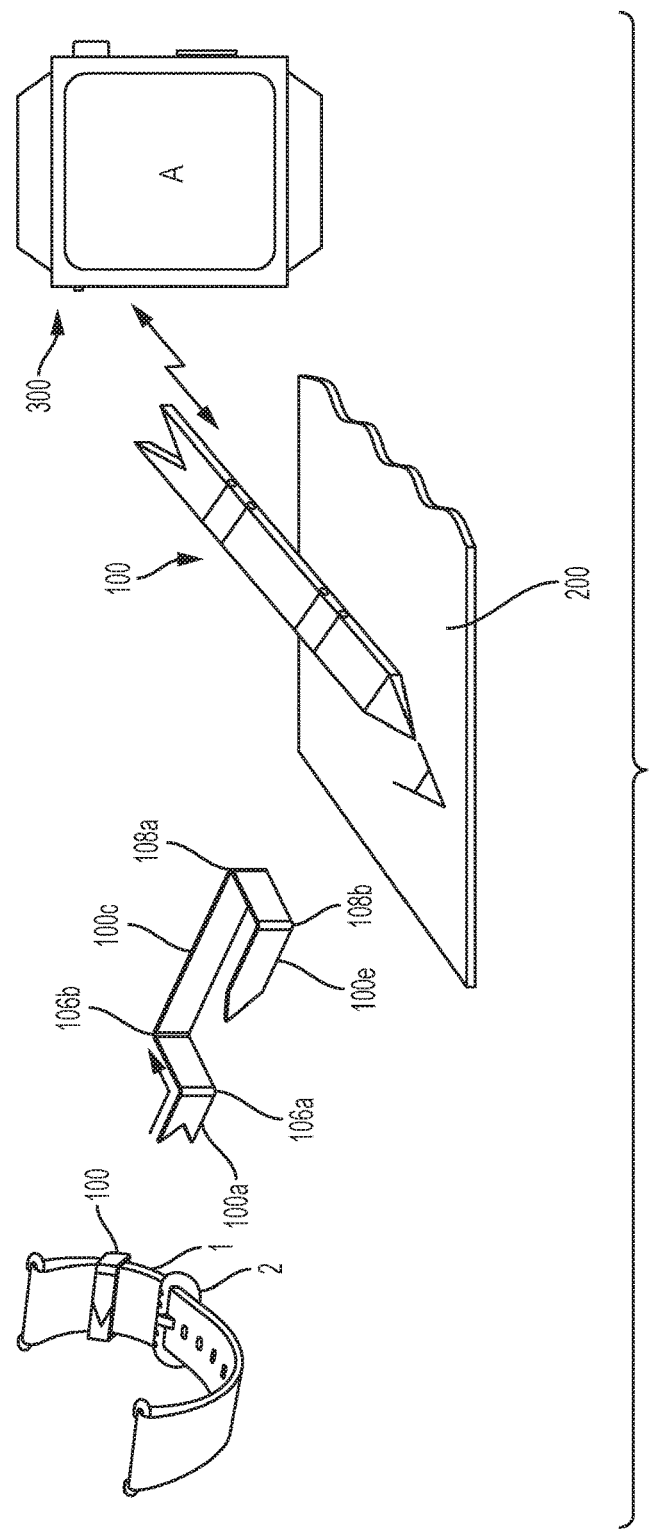
FIG. 9 illustrates a schematic representation of various stages of usage for the digital device in accordance with the present invention.

FIG. 9 illustrates a schematic representation of various stages of usage for the digital device 100 in accordance with the present invention. At a first step, the digital (input) device 100 is illustrates in the folded shape disposed around a watchband 1. For the sake of clarity, the watch clasp 2 is illustrated in FIG. 9. During use, the digital device may be unfolded and removed from the watch band 1 for use as a stylus or input pen, which is shown as a second step in FIG. 9. At the second step, the digital device 100 is illustrated in a partially open and unfolded state where the hinge 106a permits the segment 100a to be pivoted away from the pointer section 100e. At a third step of FIG. 9, the digital (input) device 100 is shown in the linear shape or condition where the segments 100a-100e of the digital device 100 is disposed in a linear configuration. In this arrangement, the digital device 100 is disposed to function as a stylus by a user whereby the digital device may be used to input data to a touch panel 200 or directly to a watch 300 having touch buttons, sections, and/or a touch panel disposed thereon.

The circuitry of the digital device 100 is disposed within the body 100a-100e and is designed and configured in accordance with known techniques. For example, FIG. 9 illustrates the digital device 100 as a stylus for use with a signal receiving surface or touch panel 200 according to various embodiments. In the example of FIG. 1, touch panel 200 can include an array of pixels formed at the crossing points of conductive rows and columns. Though the conductive elements may be disposed in rows and columns, other configurations of conductive elements are also possible according to various embodiments.

When digital device 100 touches or hovers over a surface of the touch panel 200, the stylus can form a capacitance with one or more of the conductive rows and/or columns that can be detected by sensing circuitry (not shown). The stylus touch or hover can be represented in an image captured at the touch panel 200 and processed for input information regarding the stylus. Here, the image of the letter "A" is shown by way of example. In some embodiments, the digital device 100 can act as a driving element stimulated by a stimulation signal to capacitively couple with a proximate conductive row or column of the touch panel 200, thereby forming a capacitive path for coupling charge from the stylus to that proximate row or column. The proximate row or column can output signals representative of the coupling charge to the sensing circuitry. Other forms of data transmission are also envisioned by this invention whereby the digital device may be used to send physical pressure-contact signals and/or electronic, wireless proximity signals to a touch panel 200 or a digital watch 300.

In some embodiments, the stylus or digital device 100 can act as a sensing element capacitively coupled with a proximate conductive row or column of the touch panel 200 that has been stimulated by a stimulation signal. The stylus or digital device 100 can then output signals representative of the coupling charge to the sensing circuitry.

Additionally, the digital device 100 or stylus may include circuitry to transmit data to the digital watch 300 in order that the data transmitted between the digital device 100 and the panel 200 may be transmitted to and stored by the watch 300 in various manners that are known to those of skill in the art.

As apparent from the foregoing description, the present invention provides a digital device that can be folded or unfolded, and may be affixed to a watchband, as shown in FIGS. 7 and 9. Additionally, a pair of sliding lock mechanisms ensures that the digital device 100 is retained in a straight and stable configuration or shape. The shape of pen point or nib 102a may be embedded and hidden in the body of digital device 100 at the tail end 104a. With this invention, a user does not need to carry any digital device in the user's pocket or additional devices, the nib or pointing tip 102a is better protected, the length of the digital device may be maximized.

As shown in FIGS. 3, 4, 7 and 8, the tail end 104 is a special design for retaining and protecting the pointer end or nib 102a. Moreover, the complex machine construction of the invention provides a folding or unfolding design, enabling a storage solution that is different than the prior art. The digital device further provides electronic functionality enabling use on any surface with the writing track being synchronized to a watch by a wireless and/or Bluetooth signal in a manner known in the art. The foldable device does not depend on any specially designed watch band. In fact, the folded design of this invention is suitable to bind to most generic watchbands in the market. The digital device 100 may be charged by mini button battery, and also is provided with a series of complicated components such as Trajectory Recognition Sensor and G-Sensor.

With this invention, the digital device 100 does not need the smart watch 300 to require any changes in construction to adapt to the digital device 100. The digital device 100 in this invention may be accommodated in a watch 300 designed with or without a watch buckle, therefore, when the digital device 100 may be folded as a watch buckle, and may be used in any type of watch belt without limitation and the foldable design could be used in the majority of brands of smart watches in the market. According to variations envisioned by this invention, the digital device 100 may be worn on a finger and may input text on any medium.

Figure 10:
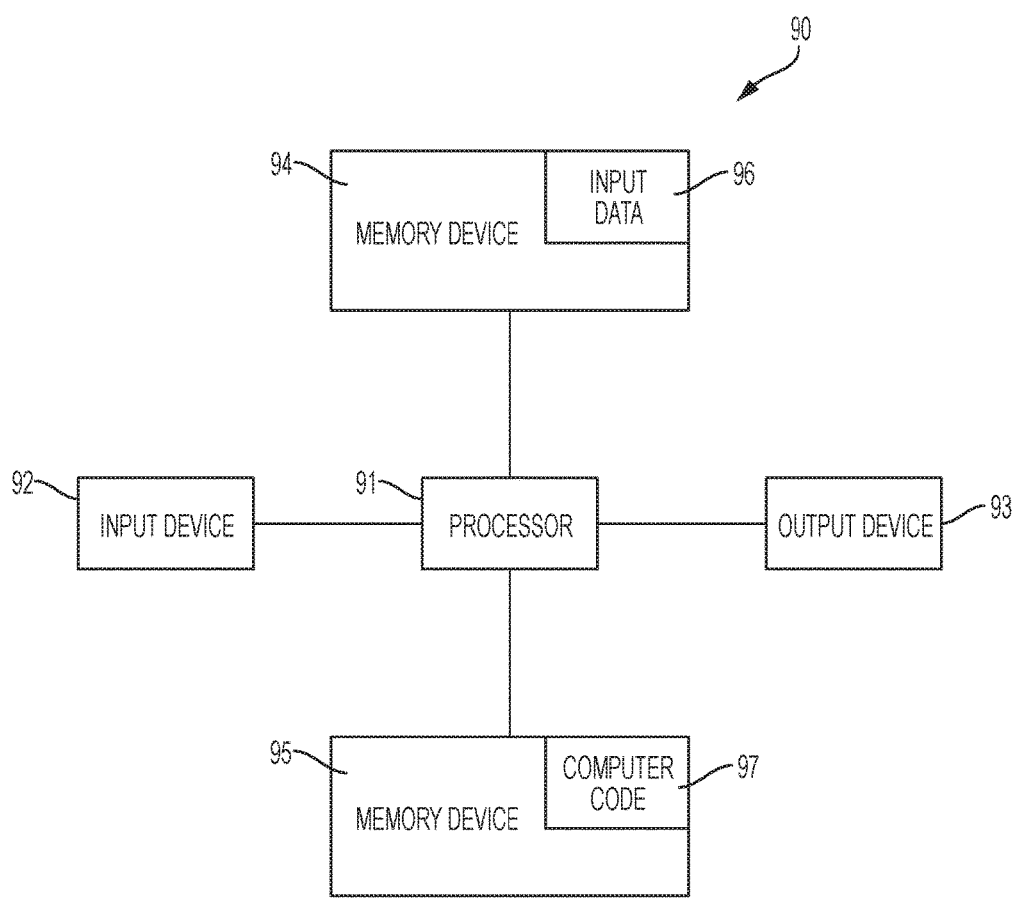
FIG. 10 illustrates a computer system used for implementing the methods of the present invention.

FIG. 10 illustrates a computer system used for implementing the methods of the present invention. The computer system 90, which may be incorporated into the digital device 100 may include a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that includes computer-executable instructions. The computer code 97 includes software or program instructions that may implement an algorithm for implementing methods of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 10) may be used as a computer usable storage medium (or program storage device) having a computer readable program embodied therein and/or having other data stored therein, wherein the computer readable program includes the computer code 97. Generally, a computer program product (or, alternatively, an article of manufacture) of the computer system 90 may include the computer usable storage medium (or said program storage device).

The processor 91 may represent one or more processors. The memory device 94 and/or the memory device 95 may represent one or more computer readable hardware storage devices and/or one or more memories.

Thus the present invention discloses a process for supporting, deploying and/or integrating computer infrastructure, integrating, hosting, maintaining, and deploying computer-readable code into the computer system 90, wherein the code in combination with the computer system 90 is capable of implementing the methods of the present invention.

While FIG. 10 shows the computer system 90 as a particular configuration of hardware and software, any configuration of hardware and software, as would be known to a person of ordinary skill in the art, may be utilized for the purposes stated supra in conjunction with the particular computer system 90 of FIG. 10. For example, the memory devices 94 and 95 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although certain embodiments of this invention have been described above with a certain degree of particularity, those skilled in the art could make numerous alterations to the disclosed embodiments without departing from the spirit or scope of this invention.

For example, the methods described herein can be either hardware- or software-implemented. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

The invention claimed is:

1. A digital input device, comprising:
a body having a pointer end and a tail end opposite said pointer end;
circuitry disposed within said body for sending or receiving signals representing a position of said pointer end relative to a signal receiving surface disposed on a watch; and
a folding assembly integrally formed with said body, said folding assembly permitting said body to fold from a linear shape to a folded shape adapted to circumscribe at least a portion of a watch band.

2. The digital input device of claim 1, further comprising:
a plurality of hinges interconnecting a plurality of segments of said body, said plurality of hinges pivotally connecting said plurality of segments to permit said body to pivot from said linear shape to a geometric shape adapted to circumscribe said portion of said watch band.

3. The digital input device of claim 2, wherein said geometric shape is a closed rectangle having a side defined by said pointer end mating with said tail end.

4. The digital input device of claim 2, wherein said geometric shape is a polygon having an open side defined by an opening between said pointer end mating and said tail end.

5. The digital input device of claim 2, wherein said plurality of hinges comprises at least four hinges separating at least five segments of said body.

6. The digital input device of claim 1, further comprising:
a shape-retention system for maintaining said body in at least one of said linear shape and said folded shape by locking a position of at least two segments of said plurality of segments relative to one another.

7. The digital input device of claim 1, further comprising:
at least one slider lock assembly slidingly disposed on said body to retain the segments of said body in said linear shape.

8. The digital input device of claim 1, further comprising:
a plurality of slider lock assemblies slidingly disposed on opposite sides of said body, said slider lock assemblies including an arm portion selectively positionable inside more than one segment of said plurality of segments.

9. The digital input device of claim 8, wherein said plurality of slider lock assemblies is manual actuated.

10. The digital input device of claim 1, wherein said pointer end is formed into a first major shape and said tail end is formed into a second complimentary shape, wherein said first major shape mates with said second complimentary shape in said folded shape.

11. The digital input device of claim 10, further comprising:
a nib at a terminal end of said pointer end, wherein said second complimentary shape includes a protective section that receives and protects said nib in said folded shape.

12. A method of forming a digital input device, comprising the steps of:
disposing circuitry within a body having a pointer end and a tail end opposite said pointer end, said circuitry configured to send or receive signals representing a position of said pointer end relative to a signal receiving surface disposed on a digital watch; and
providing a folding assembly as part of said body, said folding assembly permitting said body to fold from a linear shape to a folded shape around at least a portion of a watch band of said watch and to unfold from said folded shape to said linear shape to provide a stylus.

13. The method of claim 12, wherein said step of providing said folding assembly further comprises:
interconnecting a plurality of segments of said body with a plurality of hinges, wherein said plurality of hinges pivotally connect said plurality of segments to permit said body to pivot from said linear shape to a geometric shape adapted to circumscribe said portion of said watch band.

14. The method of claim 13, wherein said geometric shape is a closed rectangle having a side defined by said pointer end mating with said tail end.

15. The method of claim 13, wherein said geometric shape is a polygon having an open side defined by an opening between said pointer end mating and said tail end.

16. The method of claim 12, further comprising:
disposing a shape-retention system on said body for maintaining said body in at least one of said linear shape and said folded shape by locking a position of at least two segments of said plurality of segments relative to one another.

17. The method of claim 12, further comprising:
disposing at least one slider lock assembly slidingly on said body to retain the segments of said body in said linear shape.

18. The method of claim 12, further comprising:
forming said pointer end into a first major shape;
forming said tail end into a second complimentary shape; and
mating first major shape with said second complimentary shape in said folded shape.

19. The method of claim 12, further comprising:
providing a nib at a terminal end of said pointer end; and
providing a protective section at said second complimentary shape;
wherein said protective section receives and protects said nib in said folded shape.

* * * * *